US008862328B2

(12) United States Patent
Gebregergis et al.

(10) Patent No.: US 8,862,328 B2
(45) Date of Patent: Oct. 14, 2014

(54) SYSTEM AND METHOD FOR DETERMINING AN ABSOLUTE POSITION OF A MOTOR SHAFT IN AN ELECTRIC STEERING SYSTEM (75) Inventors: Abraham Gebregergis, Saginaw, MI (US); Paul Fisher, Saginaw, MI (US); Christian E. Ross, Hemlock, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 335 days.

(21) Appl. No.: 13/106,031

(22) Filed: May 12, 2011

(65) Prior Publication Data
US 2011/0282552 A1 Nov. 17, 2011

Related U.S. Application Data (60) Provisional application No. 61/334,835, filed on May 14, 2010.

(51) Int. Cl.
*B62D 15/02* (2006.01)
*B62D 5/04* (2006.01)

(52) U.S. Cl.
CPC .......... *B62D 15/021* (2013.01); *B62D 15/0235* (2013.01); *B62D 5/0418* (2013.01)
USPC ............. 701/42; 180/443; 180/444; 180/446; 701/41; 701/115

(58) Field of Classification Search
CPC .. B62D 15/02; B62D 15/021; B62D 15/0235; B62D 15/024; B62D 5/0418
USPC ........ 180/443, 444, 446; 310/254.1; 318/432, 318/712; 324/207.2, 207.21, 207.22, 324/207.25, 251, 303; 377/17; 701/115, 41, 701/42; 702/151; 73/115.04, 799, 862.331, 73/334
See application file for complete search history.

(56) References Cited

U.S. PATENT DOCUMENTS 5,241,270 A * 8/1993 Ng ................................ 324/251
5,936,524 A * 8/1999 Zhevelev et al. .............. 340/552

(Continued)

FOREIGN PATENT DOCUMENTS

EP          1726934 A1     11/2006
EP       102006042104       4/2007

(Continued)

OTHER PUBLICATIONS

European Search Report; European Application No. 11009233.5; European Filing Date: Nov. 22, 2011; Date of Mailing: Apr. 4, 2012, 5 pages.

(Continued)

*Primary Examiner* — Fadey Jabr
*Assistant Examiner* — Kevin P. Mahne
(74) *Attorney, Agent, or Firm* — Cantor Colburn LLP (57) ABSTRACT A system and a method for determining an absolute position of a motor shaft in an electric power steering system during an ignition off state are provided. The system includes a microprocessor that energizes first and second position sensors to generate first and second signals, respectively, at a first time, and third and fourth signals, respectively, at a second time. The microprocessor determines a first relative position value based on the first and second signals, and a second relative position value based on the third and fourth signals. The microprocessor determines an amount of relative rotation of the shaft during the ignition off state based on the first and second relative position values, and determines a current absolute position value based on a previously stored absolute position value and the amount of relative rotation of the rotatable shaft.

19 Claims, 6 Drawing Sheets

(56) References Cited

U.S. PATENT DOCUMENTS

| | | | |
|---|---|---|---|
| 6,314,355 B1* | 11/2001 | Mizuta et al. | 701/41 |
| 6,364,050 B1* | 4/2002 | Horton | 180/446 |
| 6,400,142 B1 | 6/2002 | Schroeder | |
| 6,498,749 B1* | 12/2002 | Cuppens et al. | 365/185.09 |
| 6,498,971 B2 | 12/2002 | Leaphart | |
| 8,093,886 B2* | 1/2012 | Okada et al. | 324/207.21 |
| 8,171,875 B1* | 5/2012 | Caldwell et al. | 116/22 A |
| 8,179,127 B2* | 5/2012 | West et al. | 324/207.25 |
| 8,297,682 B2* | 10/2012 | Oirsouw et al. | 296/146.4 |
| 2003/0067243 A1* | 4/2003 | Hollenbeck et al. | 310/254 |
| 2003/0218458 A1* | 11/2003 | Seger et al. | 324/303 |
| 2006/0065471 A1* | 3/2006 | Davis et al. | 180/444 |
| 2008/0282788 A1* | 11/2008 | Pattok et al. | 73/117.02 |
| 2008/0299938 A1* | 12/2008 | Meshenberg | 455/343.2 |
| 2009/0319125 A1* | 12/2009 | Lavoie | 701/41 |
| 2009/0322268 A1* | 12/2009 | Imamura et al. | 318/400.23 |
| 2010/0045795 A1* | 2/2010 | Jezierski et al. | 348/143 |
| 2010/0057299 A1* | 3/2010 | Burgdorf et al. | 701/42 |
| 2010/0235052 A1* | 9/2010 | Shartle et al. | 701/41 |

FOREIGN PATENT DOCUMENTS

| | | |
|---|---|---|
| EP | 102006014700 | 9/2007 |
| EP | 1916176 A1 | 4/2008 |

OTHER PUBLICATIONS

EP Application No. 11004000.3, Extended Search Report dated Sep. 12, 2012, 9 pages.

\* cited by examiner

SYSTEM AND METHOD FOR DETERMINING AN ABSOLUTE POSITION OF A MOTOR SHAFT IN AN ELECTRIC STEERING SYSTEM

CROSS REFERENCE TO RELATED APPLICATIONS

The application claims the benefit of U.S. Provisional Application Ser. No. 61/334,835, filed May 14, 2010, the contents of which are incorporated herein by reference thereto.

FIELD OF THE INVENTION

The subject application relates to a system and a method for determining an absolute rotational position of a motor shaft in an electric steering system when a vehicle has an ignition off state.

BACKGROUND

A vehicle electric power steering system has utilized a microprocessor that monitors a motor shaft position in the electric power steering system. The microprocessor, however, is turned off when the ignition of the vehicle is off (i.e., an ignition off state of the vehicle). Accordingly, if a vehicle operator turns the steering wheel during the ignition off state, when the microprocessor is subsequently turned on during an ignition on state, the microprocessor may not be able to accurate determine an absolute rotational position of the motor shaft.

Accordingly, it is desirable to provide a system and a method for determining an absolute rotational position of a rotatable shaft of a motor in an electric power steering system during an ignition off state of the vehicle.

SUMMARY OF THE INVENTION

A system for determining an absolute rotational position of a rotatable shaft of a motor in an electric power steering system of a vehicle in accordance with an exemplary embodiment is provided. The system includes a microprocessor configured to be periodically activated during an ignition off state of the vehicle by a timer circuit. The microprocessor is further configured to energize first and second position sensors at a first time when the microprocessor is activated. The first and second position sensors are configured to generate first and second signals, respectively, indicative of a relative rotational position of the rotatable shaft at the first time. The microprocessor is further configured to measure the first and second signals and to determine a first relative position value indicating the relative rotational position of the rotatable shaft at the first time, and then to be deactivated. The microprocessor is further configured to energize the first and second position sensors at a second time when the microprocessor is activated. The second time is after the first time and is also after the microprocessor was deactivated. The first and second position sensors are further configured to generate third and fourth signals, respectively, indicative of a relative rotational position of the rotatable shaft at the second time. The microprocessor is further configured to measure the third and fourth signals and to determine a second relative position value indicating the relative rotational position of the rotatable shaft at the second time. The microprocessor is further configured to determine an amount of relative rotation of the rotatable shaft during the ignition off state based on the first and second relative position values. The microprocessor is further configured to determine a current absolute position value indicating a current absolute rotational position of the rotatable shaft based on a previously stored absolute position value and the amount of relative rotation of the rotatable shaft.

A method for determining an absolute rotational position of a rotatable shaft of a motor in an electric power steering system of a vehicle in accordance with another exemplary embodiment is provided. The method includes periodically activating a microprocessor during an ignition off state of the vehicle utilizing a timer circuit. The method further includes energizing first and second position sensors at a first time when the microprocessor is activated, utilizing the microprocessor. The method further includes generating first and second signals, respectively, indicative of a relative rotational position of the rotatable shaft at the first time utilizing the first and second position sensors, respectively. The method further includes measuring the first and second signals and determining a first relative position value indicating the relative rotational position of the rotatable shaft at the first time utilizing the microprocessor. The method further includes deactivating the microprocessor after determining the first relative position value. The method further includes energizing the first and second position sensors at a second time when the microprocessor is activated, utilizing the microprocessor. The second time is after the first time and is also after the microprocessor was deactivated. The method further includes generating third and fourth signals, respectively, indicative of a relative rotational position of the rotatable shaft at the second time, utilizing the first and second position sensors, respectively. The method further includes measuring the third and fourth signals and determining a second relative position value indicating the relative rotational position of the rotatable shaft at the second time utilizing the microprocessor. The method further includes determining an amount of relative rotation of the rotatable shaft during the ignition off state based on the first and second relative position values utilizing the microprocessor. The method further includes determining a current absolute position value indicating a current absolute rotational position of the rotatable shaft based on a previously stored absolute position value and the amount of relative rotation of the rotatable shaft utilizing the microprocessor. The method further includes storing the current absolute position value in the memory device utilizing the microprocessor.

A system for determining an absolute rotational position of a rotatable shaft of a motor in an electric power steering system of a vehicle in accordance with another exemplary embodiment is provided. The system includes a comparator configured to compare first and second back electromotive force voltages from first and second phases, respectively, of the motor to a reference voltage, and to output a control signal when either the first back electromotive force voltage is greater than the reference voltage or the second back electromotive force voltage is greater than the reference voltage. The microprocessor is configured to be activated in response to the control signal. The microprocessor is further configured to energize first and second position sensors at a first time when the microprocessor is activated. The first and second position sensors are configured to generate first and second signals, respectively, indicative of a relative rotational position of the rotatable shaft. The microprocessor is further configured to measure the first and second signals and to determine a first relative position value indicating a relative rotational position of the rotatable shaft at the first time. The microprocessor is further configured to measure the first and second signals and to determine a second relative position value indicating a relative position of the rotatable shaft at the second time. The second time is after the first time. The microprocessor is further configured to determine an amount of relative rotation of the rotatable shaft during the ignition off state based on the first and second relative position values. The microprocessor is further configured to determine a current absolute position value indicating a current absolute rotational position of the rotatable shaft based on a previously stored absolute position value and the amount of relative rotation of the rotatable shaft.

A system for determining an absolute rotational position of a rotatable shaft of a motor in an electric power steering system having a power on state and a power off state in accordance with another exemplary embodiment is provided. The system includes a microprocessor configured to be periodically activated during the power off state of the system by a timer circuit. The microprocessor is further configured to energize a plurality of position sensors when the microprocessor is activated. The plurality of position sensors are configured to generate at least a first signal and a second signal indicative of a relative rotational position of the rotatable shaft at a first time. The plurality of position sensors are further configured to generate at least a third signal and a fourth signal indicative of a relative rotational position of the rotatable shaft at the second time. The second time is different than the first time. The microprocessor is further configured to determine an amount of relative rotation of the rotatable shaft during the power off state based on a difference between the relative rotational position at the first time and the relative rotational position at the second time. The microprocessor is further configured to determine a current absolute rotational position of the rotatable shaft based on an absolute position value stored during the power on state and the amount of relative rotation of the rotatable shaft.

A method for determining an absolute rotational position of a rotatable shaft of a motor in an electric power steering system having a power on state and a power off state in accordance with another exemplary embodiment is provided. The method includes periodically activating a microprocessor during the power off state of the system. The method further includes determining a first relative position value indicating the relative rotational position of the rotatable shaft at a first time during the power off state utilizing the microprocessor. The method further includes deactivating the microprocessor after determining the first relative position value. The method further includes determining a second relative position value indicating the relative rotational position of the rotatable shaft at a second time during the power off state utilizing the microprocessor. The method further includes determining an amount of relative rotation of the rotatable shaft during the power off state based on the first and second relative position values. The method further includes determining a current absolute position value indicating a current absolute rotational position of the rotatable shaft by comparing an absolute position value stored during the power on state and the amount of relative rotation of the rotatable shaft utilizing the microprocessor. The method further includes storing the current absolute position value in the memory device.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
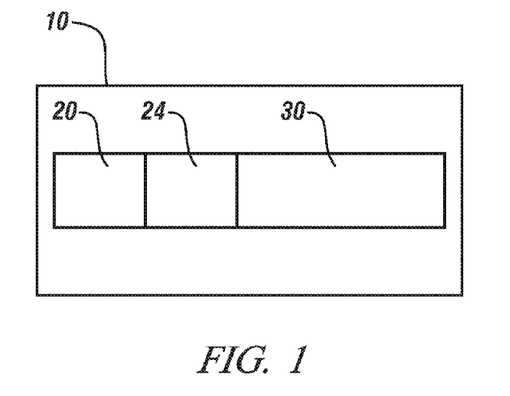
FIG. 1 is a block diagram of a vehicle having a handwheel, an electric power steering system, and a position determination system in accordance with an exemplary embodiment.
Figure 2:
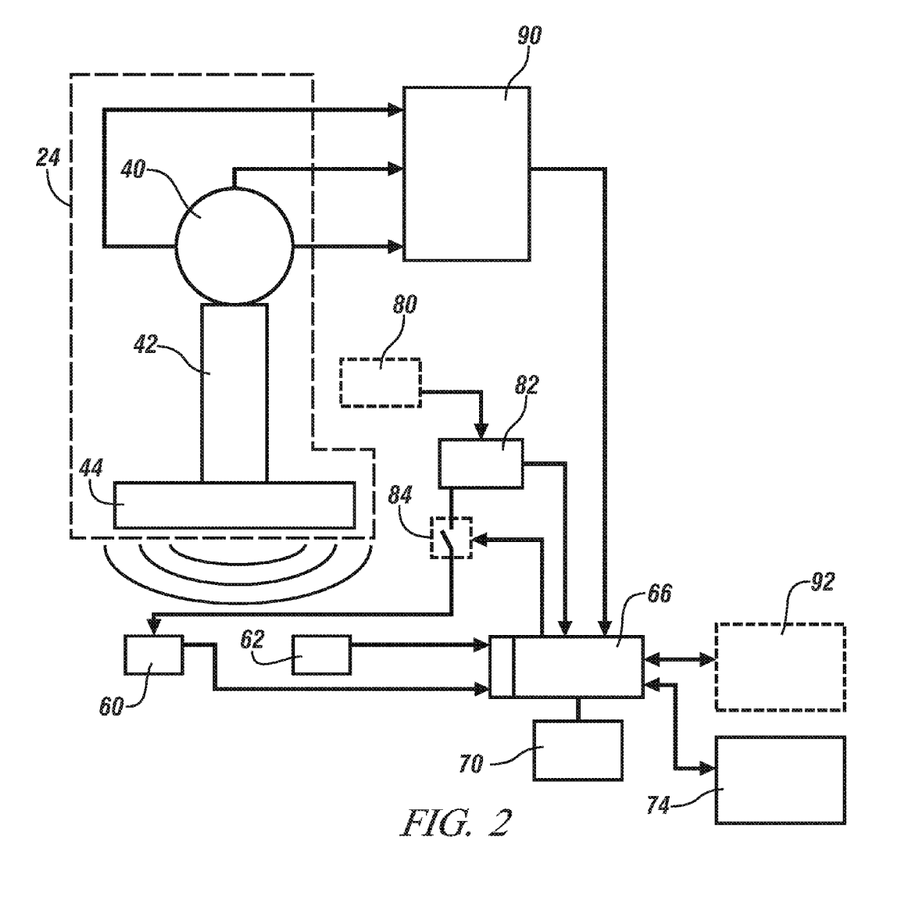
FIG. 2 is a block diagram of the electric power steering system and the position determination system shown in FIG. 1.

Referring now to FIGS. 1 and 2, a vehicle 10 having a handwheel 20, an electric power steering system 24, and a position determination system 30 in accordance with an exemplary embodiment is illustrated. The term "ignition off state" used herein corresponds to a power off state of an electric power steering system, and the term "ignition on state" corresponds to a power on state of an electric power steering system.

The handwheel 20 is operably coupled to the electric power steering system 24. Rotation of the handwheel 20 induces the electric power steering system 24 to cause rotation of a rotatable motor shaft 42 operably coupled to a rack-and-pinion assembly to move an operational position of vehicle wheels.

The electric power steering system 24 includes an electric motor 40 having the rotatable shaft 42 and a magnet 44 coupled to the rotatable shaft 42. In one embodiment, the rotatable shaft 42 is operably coupled via a gear assembly to a rack-and-pinion assembly for controlling an operational position of vehicle wheels.

The position determination system 30 is provided to determine an absolute rotational position of the rotatable shaft 42 of the motor 40 when the vehicle 10 has an ignition off state. The system 30 includes first and second position sensors 60, 62, a microprocessor 66, a timer circuit 70, a memory device 74, a power source 80, a voltage regulator 82, a switch 84, a comparator 90, and a main controller 92.

Figure 4:
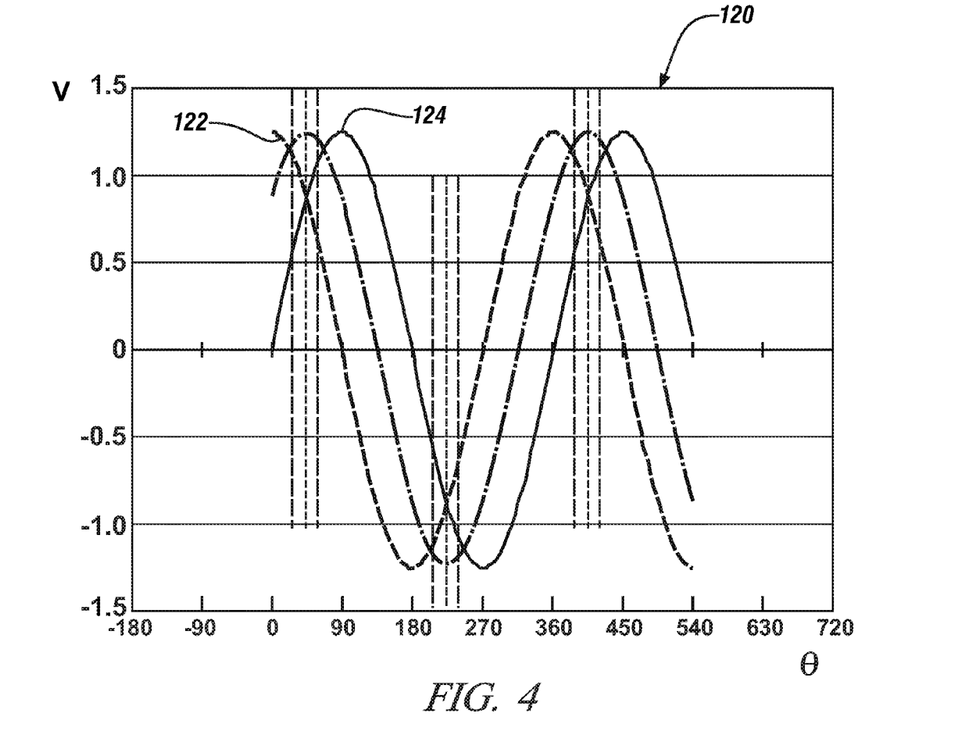
FIG. 4 is a graph of first and second signals generated by first and second position sensors utilized in the position determination system of FIG. 1.
Figure 5:
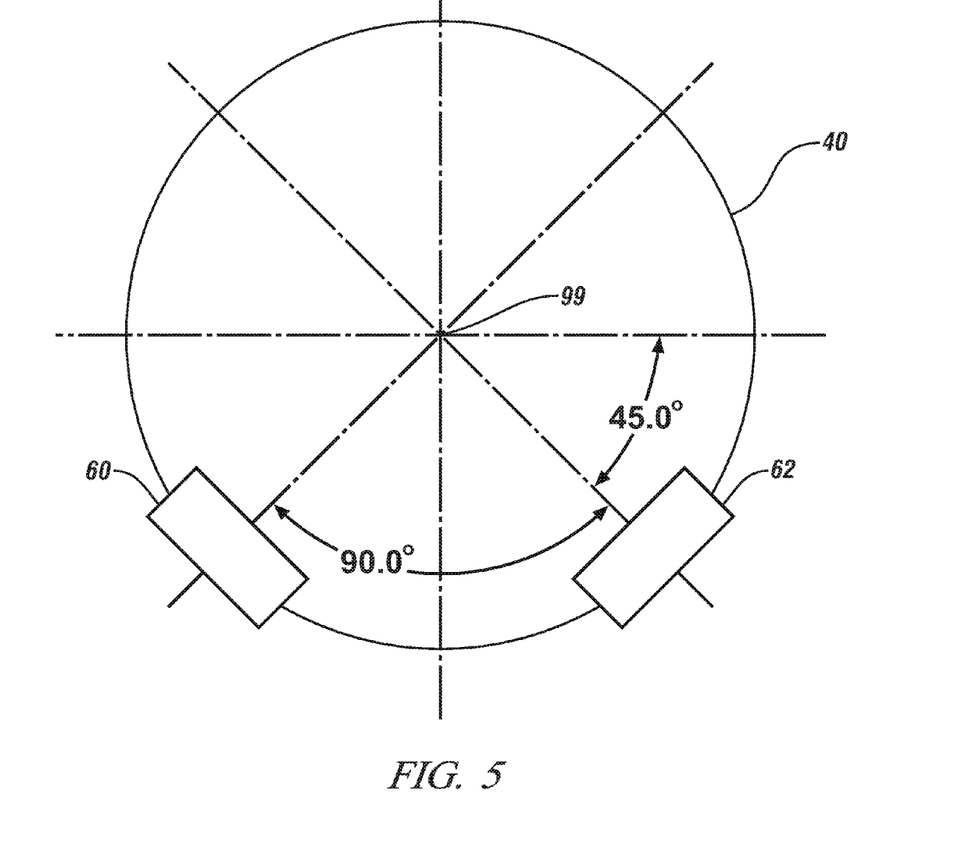
FIG. 5 is a block diagram illustrating exemplary positions of first and second position sensors utilized in the position determination system of FIG. 1.

Referring to FIGS. 2, 4 and 5, the first and second position sensors 60, 62 are configured to generate first and second signals indicative of a relative position of the rotatable shaft 42 of the motor 40. In one exemplary embodiment, the first and second position sensors 60, 62 are Hall effect sensors that generate the first and second signals, respectively, in response to detecting a magnetic field from the magnet 44 coupled to the rotatable shaft 42. In one exemplary embodiment, the first and second position sensors 60, 62 are disposed 90 degrees apart from one another about a central axis 99 of the rotatable shaft 42. As shown in FIG. 4, the first position sensor 60 can generate a first signal over time represented by signal curve 122 as the rotatable shaft 42 and the magnet 44 are rotated. Also, the second position sensor 62 can generate a second signal over time represented by signal curve 124 as the rotatable shaft 42 and the magnet 44 are rotated.

The timer circuit 70 is operably coupled to the microprocessor 66. The timer circuit 70 is configured to periodically generate a control signal that activates the microprocessor 66 when the vehicle 10 has an ignition off state. In one exemplary embodiment, the timer circuit 70 generates the control signal every 256 milliseconds to activate the microprocessor 66. Of course, other time intervals are contemplated.

The memory device 74 is operably coupled to the microprocessor 66. The microprocessor 66 is configured to store data values in the memory device 74 as will be explained in greater detail below.

The power source 80 is configured to output a voltage which is regulated utilizing the voltage regulator 82. The voltage regulator 82 outputs an operational voltage that is received by the microprocessor 66 for powering the microprocessor 66.

The switch 84 is coupled between the voltage regulator 82 and the position sensors 60, 62. When the switch 84 has a closed operational position, an operational voltage from the voltage regulator 82 is supplied to the first and second position sensors 60, 62 to energize the position sensors 60, 62. Alternately, when the switch 84 has an open operational position, an operational voltage from the voltage regulator 82 is removed from the first and second position sensors 60, 62 to de-energize the position sensors 60, 62. In one exemplary embodiment, the switch 84 is a p-channel MOSFET that is switched to either the closed operational position or the open operational position by control signals from the microprocessor 66.

The comparator 90 is configured to compare the first, second, and third back electromotive force voltages from first, second, and third phases, respectively, of the motor 40 to a reference voltage. The comparator 90 outputs an interrupt/control signal that is received by the microprocessor 66 when either the first back electromotive force voltage is greater than the reference voltage, or the second back electromotive force voltage is greater than the reference voltage, or the third back electromotive force voltage is greater than the reference voltage, indicating that a rotational speed of the shaft 42 is greater than a threshold rotational speed. Of course, in an alternative embodiment, comparator 90 is configured to compare the first and second back electromotive force voltages from first and second phases, respectively, of the motor 40 to the reference voltage. When the microprocessor 66 receives the interrupt/control signal from the comparator 90, the microprocessor 66 wakes up from a low power sleep mode to determine the absolute rotational position of the shaft 42.

Figure 3:
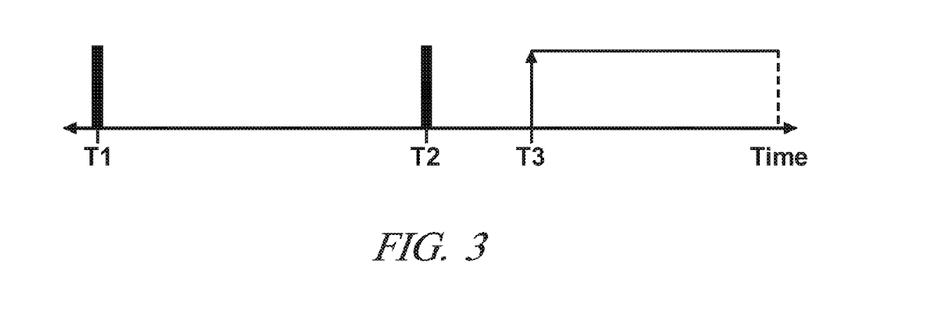
FIG. 3 is an exemplary timing diagram indicating when the position determination system monitors the handwheel position during an ignition off state of the vehicle.

Referring to FIGS. 2 and 3, the microprocessor 66 is operably coupled to the voltage regulator 82, the switch 84, the first and second position sensors 60, 62, the timer circuit 70, the memory device 74, the comparator 90, and the main controller 92. The microprocessor 66 determines the absolute rotational position of the shaft 42 during the vehicle ignition off state by being periodically activated by a control signal from the timer circuit 70 or by being activated by an interrupt/control signal from the comparator 90. In particular, in one exemplary embodiment, the microprocessor 66 is periodically activated by the timer circuit 70 to periodically monitor the first and second position signals from the first and second position sensors 60, 62 during the ignition off state of the vehicle 10. For example, the timer circuit 70 can wake up or activate the microprocessor 66 at times T1 and T2 representing a 256 millisecond time interval between activations. After, the microprocessor 66 is activated, the microprocessor 66 measures the first and second position signals from the position sensors 60, 62 for 50-100 µsecond and then is deactivated. The microprocessor 66 has an activation duty cycle that is defined by a desired quiescent current draw of the microprocessor 66 and a desired maximum speed of the shaft 42. Also, the microprocessor 66 can be activated at a time T3 by an interrupt/control signal from the comparator 90. The operation of the microprocessor 66 will be discussed in greater detail below.

Figure 6:
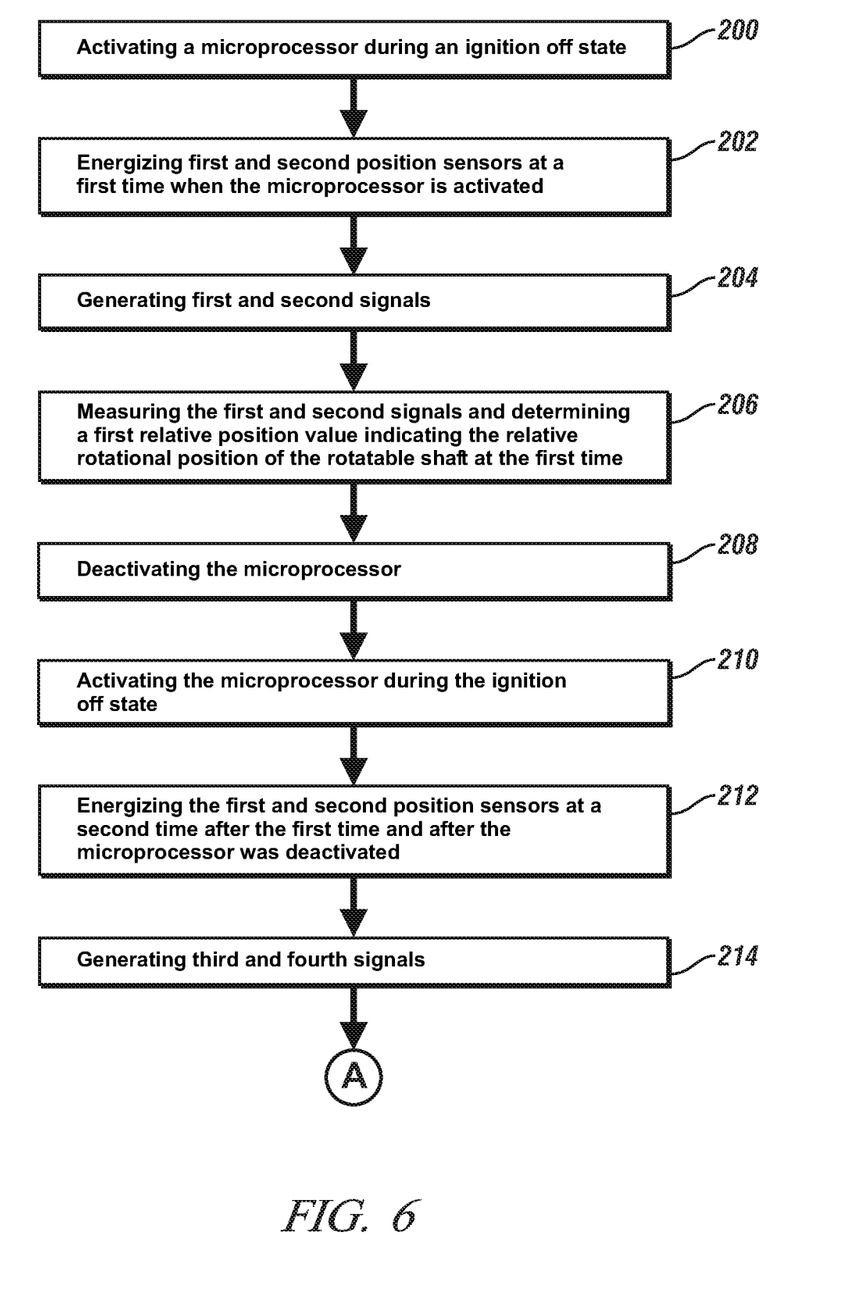
FIGS. 6 and 7 are flowcharts of a method for determining an absolute rotational position of a rotatable shaft of a motor in the electric power system of FIG. 1 in accordance with another exemplary embodiment.
Figure 7:
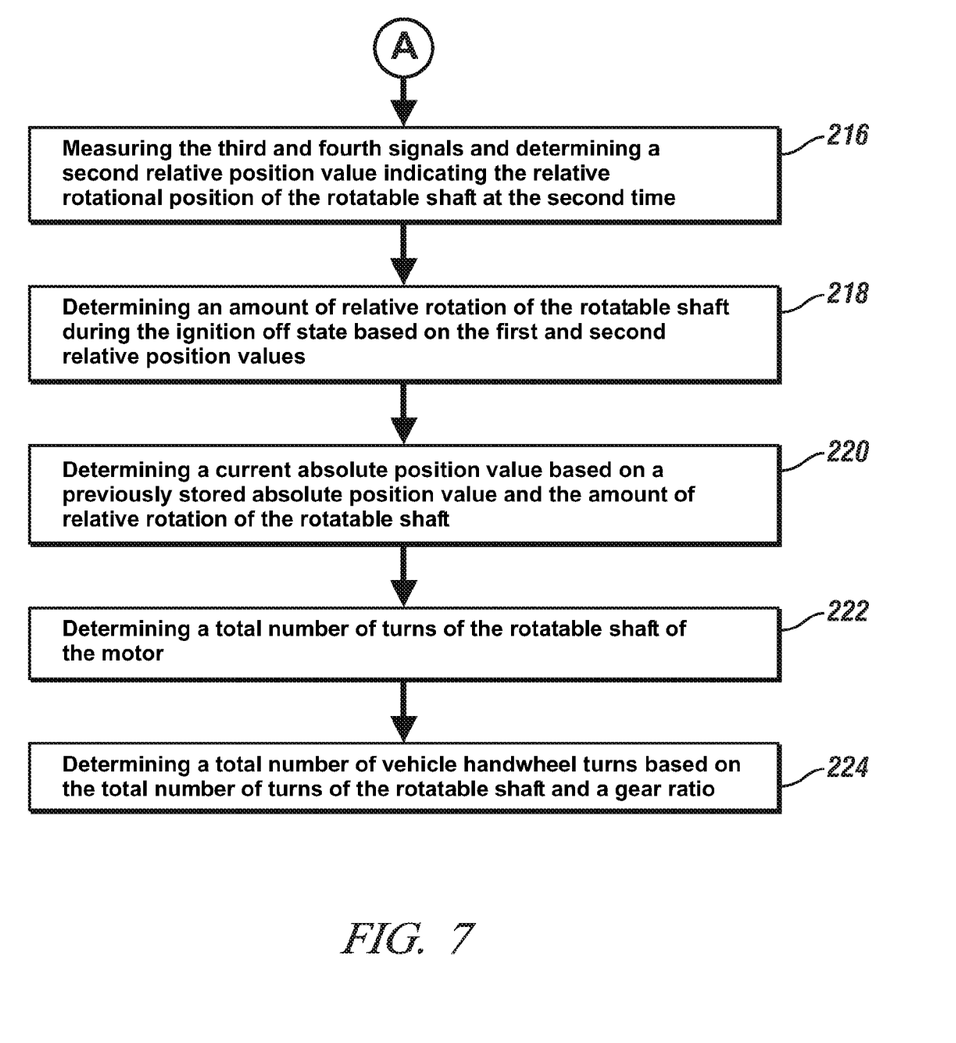

Referring to FIGS. 2, 6 and 7, a flowchart of a method for determining an absolute rotational position of the rotatable shaft 42 of the motor 40 in the electric power steering system 24 in accordance with an exemplary embodiment will be explained.

At step 200, the timer circuit 70 generates a control signal to activate the microprocessor 66 during an ignition off state of the vehicle 10.

At step 202, the microprocessor 66 generates a control signal that induces the switch 84 to supply an operational voltage to the first and second position sensors 60, 62 to energize the first and second position sensors 60, 62 at a first time when the microprocessor 66 is activated.

At step 204, the first and second position sensors 60, 62 generate first and second signals, respectively, indicative of a relative rotational position of the rotatable shaft 42 at the first time.

At step 206, the microprocessor 66 measures the first and second signals and determines a first relative position value indicating the relative rotational position of the rotatable shaft 42 at the first time and stores the first relative position value in the memory device 74. In one exemplary embodiment, the first relative position value is determined utilizing the following equation: first relative position value=ArcTan (amplitude of signal curve 124 at the first time/amplitude of signal curve 122 at the first time) wherein signal curves 122, 124 are shown in FIG. 4.

At step 208, the microprocessor 66 deactivates itself after storing the first relative position value in the memory device 74.

At step 210, the timer circuit 70 generates a control signal to activate the microprocessor 66 during the ignition off state of the vehicle 10.

At step 212, the microprocessor 66 generates a control signal that induces the switch 84 to supply an operational voltage to the first and second position sensors 60, 62 to energize the first and second position sensors 60, 62 at a second time after the first time and after the microprocessor 66 was deactivated.

At step 124, the first and second position sensors 60, 62 generate third and fourth signals, respectively, indicative of a relative rotational position of the rotatable shaft 42 at the second time.

At step 216, the microprocessor 66 measures the third and fourth signals and determines a second relative position value indicating the relative rotational position of the rotatable shaft 42 at the second time based on the third and fourth signals, and stores the second relative position value in the memory device 74.

At step 218, the microprocessor 66 determines an amount of relative rotation of the rotatable shaft 42 during the ignition off state based on the first and second relative position values, and stores the amount of relative rotation in the memory device 74. In one exemplary embodiment, the amount of relative rotation is determined utilizing the following equation: amount of relative rotation=first relative position value–second relative position value.

At step 220, the microprocessor 66 determines a current absolute position value indicating a current absolute rotational position of the rotatable shaft 42 based on a previously stored absolute position value and the amount of relative rotation of the rotatable shaft 42, and stores the current absolute position value in the memory device 74. In particular, the current absolute position value is calculated utilizing the following equation: current absolute position value=previously stored absolute position value+amount of relative rotation of the rotatable shaft 42.

At step 222, the microprocessor 66 determines a total number of turns of the rotatable shaft 42 of the motor 40 by dividing the current absolute rotational position of the rotatable shaft 42 by 360 degrees, and stores the total number of turns of the rotatable shaft 42 of the motor 40 in the memory device 74. In particular, the total number of turns of the rotatable shaft 42 is calculated utilizing the following equation: total number of turns of the rotatable shaft 42=current absolute rotational position of the rotatable shaft 42/360 degrees.

At step 224, the microprocessor 66 determines a total number of vehicle handwheel turns based on the total number of turns of the rotatable shaft 42 of the motor 40 and a gear ratio associated with the electric power steering system, and stores the total number of vehicle handwheel turns in the memory device 74. In one exemplary embodiment, the total number of vehicle handwheel turns is determined utilizing the following equation: total number of vehicle handwheel turns=the total number of turns of the rotatable shaft 42 of the motor 40/gear ratio associated with the electric power steering system.

Figure 8:
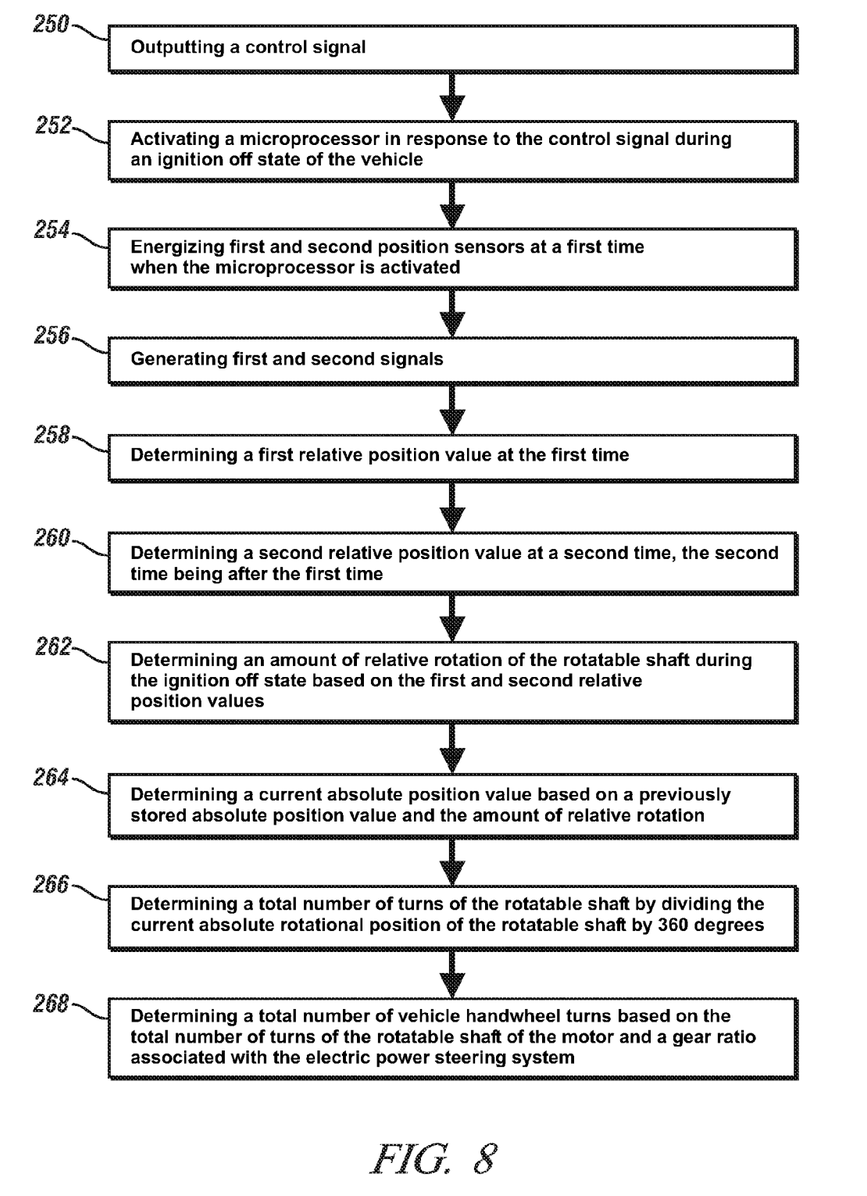
FIG. 8 is a flowchart of another method for determining an absolute rotational position of a rotatable shaft of a motor in the electric power system of FIG. 1 in accordance with another exemplary embodiment.

Referring to FIGS. 2 and 8, a flowchart of another method for determining an absolute rotational position of the rotatable shaft 42 of the motor 40 in the electric power steering system 24 in accordance with another exemplary embodiment will be explained.

At step 250, the comparator 90 compares first and second back electromotive force voltages from first and second phases, respectively, of the motor 40 to a reference voltage, and outputs a control signal when either the first back electromotive force voltage is greater than the reference voltage or the second back electromotive force voltage is greater than the reference voltage.

At step 252, the microprocessor 66 is activated in response to the control signal during an ignition off state of the vehicle 10.

At step 254, the microprocessor 66 generates a control signal that induces the switch 84 to supply an operational voltage to the first and second position sensors 60, 62 to energize the first and second position sensors 60, 62 at a first time when the microprocessor 66 is activated.

At step 256, the first and second position sensors 60, 62 generate first and second signals, respectively, indicative of a relative rotational position of the rotatable shaft 42 over time.

At step 258, the microprocessor 66 measures the first and second signals and determines a first relative position value indicating a relative rotational position of the rotatable shaft 42 at the first time, and stores the first relative position value in the memory device 74.

At step 260, the microprocessor 66 measures the first and second signals and determines a second relative position value indicating a relative position of the rotatable shaft 42 at a second time and stores the second relative position value in the memory device 74. The second time is after the first time.

At step 262, the microprocessor 66 determines an amount of relative rotation of the rotatable shaft 42 during the ignition off state based on the first and second relative position values, and stores the amount of relative rotation in the memory device 74.

At step 264, the microprocessor 66 determines a current absolute position value indicating a current absolute rotational position of the rotatable shaft 42 based on a previously stored absolute position value and the amount of relative rotation of the rotatable shaft 42, and stores the current absolute position value in the memory device 74.

At step 266, the microprocessor 66 determines a total number of turns of the rotatable shaft 42 of the motor 40 by dividing the current absolute rotational position of the rotatable shaft 42 by 360 degrees, and stores the total number of turns of the rotatable shaft 42 of the motor 40 in the memory device 74.

At step 268, the microprocessor 66 determines a total number of vehicle handwheel turns based on the total number of turns of the rotatable shaft 42 of the motor 40 and a gear ratio associated with the electric power steering system, and stores the total number of vehicle handwheel turns in the memory device 74.

It should be noted that the microprocessor 66 can operate in a low power mode drawing less than 70 µA when there is no movement of the shaft 42. The microprocessor 66 can also monitor rotational speeds of the shaft 42 up to 11,000 RPM and has a resolution of one-half of a mechanical revolution of the shaft 42. In addition, the microprocessor 66 can determine+/−1080° of handwheel movement (e.g., three handwheel revolutions).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed or contemplated for carrying out this invention, but that the invention will include all embodiments falling within the scope of the present application.

What is claimed is:

1. A system for determining an absolute rotational position of a rotatable shaft of a motor in an electric power steering system of a vehicle, comprising:

a microprocessor configured to be periodically activated to wake up from a low power sleep mode during an ignition off state of the vehicle by a timer circuit according to an activation duty cycle defined by a desired quiescent current draw of the microprocessor and a desired maximum speed of the rotatable shaft, the microprocessor further configured to energize first and second position sensors at a first time when the microprocessor is activated;

the first and second position sensors configured to generate first and second signals, respectively, indicative of a relative rotational position of the rotatable shaft at the first time;

the microprocessor further configured to measure the first and second signals and to determine a first relative position value indicating the relative rotational position of the rotatable shaft at the first time, and then to be deactivated, the microprocessor further configured to energize the first and second position sensors at a second time when the microprocessor is activated, the second time being after the first time and after the microprocessor was deactivated;

the first and second position sensors further configured to generate third and fourth signals, respectively, indicative of a relative rotational position of the rotatable shaft at the second time;

the microprocessor further configured to measure the third and fourth signals and to determine a second relative position value indicating the relative rotational position of the rotatable shaft at the second time, the microprocessor further configured to determine an amount of relative rotation of the rotatable shaft during the ignition off state based on the first and second relative position values, and the microprocessor further configured to determine a current absolute position value indicating a current absolute rotational position of the rotatable shaft based on a previously stored absolute position value and the amount of relative rotation of the rotatable shaft.

2. The system of claim 1, wherein the microprocessor is further configured to determine a total number of turns of the rotatable shaft of the motor by dividing the current absolute rotational position of the rotatable shaft by 360 degrees.

3. The system of claim 2, wherein the microprocessor is further configured to determine a total number of vehicle handwheel turns based on the total number of turns of the rotatable shaft of the motor and a gear ratio associated with the electric power steering system.

4. The system of claim 1, wherein the first and second position sensors are first and second Hall effect sensors, respectively, that are configured to measure a magnetic field of a magnet that is coupled to the rotatable shaft.

5. The system of claim 4, wherein the first and second Hall effect sensors are disposed 90 degrees apart from one another about a central axis of the rotatable shaft.

6. The system of claim 1, wherein the microprocessor is configured to energize the first and second position sensors at the first time by generating a control signal that induces a switch coupled to the first and second position sensors to supply an operational voltage to the first and second position sensors.

7. The system of claim 1, wherein a time interval between activations of the microprocessor is utilized to reduce power consumption of the microprocessor.

8. A method for determining an absolute rotational position of a rotatable shaft of a motor in an electric power steering system of a vehicle, comprising:
periodically activating a microprocessor to wake up from a low power sleep mode during an ignition off state of the vehicle utilizing a timer circuit according to an activation duty cycle defined by a desired quiescent current draw of the microprocessor and a desired maximum speed of the rotatable shaft;
energizing first and second position sensors at a first time when the microprocessor is activated, utilizing the microprocessor;
generating first and second signals, respectively, indicative of a relative rotational position of the rotatable shaft at the first time utilizing the first and second position sensors, respectively;
measuring the first and second signals and determining a first relative position value indicating the relative rotational position of the rotatable shaft at the first time utilizing the microprocessor;
deactivating the microprocessor after determining the first relative position value;
energizing the first and second position sensors at a second time when the microprocessor is activated, utilizing the microprocessor, the second time being after the first time and after the microprocessor was deactivated;
generating third and fourth signals, respectively, indicative of a relative rotational position of the rotatable shaft at the second time, utilizing the first and second position sensors, respectively;
measuring the third and fourth signals and determining a second relative position value indicating the relative rotational position of the rotatable shaft at the second time utilizing the microprocessor;
determining an amount of relative rotation of the rotatable shaft during the ignition off state based on the first and second relative position values utilizing the microprocessor;
determining a current absolute position value indicating a current absolute rotational position of the rotatable shaft based on a previously stored absolute position value and the amount of relative rotation of the rotatable shaft utilizing the microprocessor; and
storing the current absolute position value in the memory device utilizing the microprocessor.

9. The method of claim 8, further comprising determining a total number of turns of the rotatable shaft of the motor by dividing the current absolute rotational position of the rotatable shaft by 360 degrees.

10. The method of claim 9, further comprising determining a total number of vehicle handwheel turns based on the total number of turns of the rotatable shaft of the motor and a gear ratio associated with the electric power steering system, utilizing the microprocessor.

11. The method of claim 8, wherein the first and second position sensors are first and second Hall effect sensors, respectively, that are configured to measure a magnetic field of a magnet that is coupled to the rotatable shaft.

12. The method of claim 11, wherein the first and second Hall effect sensors are disposed 90 degrees apart from one another about a central axis of the rotatable shaft.

13. The method of claim 8, further comprising energizing the first and second position sensors at the first time by generating a control signal which induces a switch coupled to the first and second position sensors to supply an operational voltage to the first and second position sensors utilizing the microprocessor.

14. The method of claim 8, wherein a time interval between activations of the microprocessor is utilized to reduce power consumption of the microprocessor.

15. A system for determining an absolute rotational position of a rotatable shaft of a motor in an electric power steering system of a vehicle, comprising:
a comparator configured to compare first and second back electromotive force voltages from first and second phases, respectively, of the motor to a reference voltage, and to output a control signal when either the first back electromotive force voltage is greater than the reference voltage or the second back electromotive force voltage is greater than the reference voltage;
the microprocessor configured to be activated to wake up from a low power sleep mode in response to the control signal;
the microprocessor further configured to be periodically activated to wake up from the low power sleep mode by a timer circuit according to an activation duty cycle defined by a desired quiescent current draw of the microprocessor and a desired maximum speed of the rotatable shaft;
the microprocessor further configured to energize first and second position sensors at a first time when the microprocessor is activated;
the first and second position sensors configured to generate first and second signals, respectively, indicative of a relative rotational position of the rotatable shaft;
the microprocessor further configured to measure the first and second signals and to determine a first relative position value indicating a relative rotational position of the rotatable shaft at the first time;

the microprocessor further configured to measure the first and second signals and to determine a second relative position value indicating a relative position of the rotatable shaft at the second time, the second time being after the first time;

the microprocessor further configured to determine an amount of relative rotation of the rotatable shaft during the ignition off state based on the first and second relative position values; and the microprocessor further configured to determine a current absolute position value indicating a current absolute rotational position of the rotatable shaft based on a previously stored absolute position value and the amount of relative rotation of the rotatable shaft.

16. A method for determining an absolute rotational position of a rotatable shaft of a motor in an electric power steering system having a power on state and a power off state, comprising:

periodically activating a microprocessor to wake up from a low power sleep mode during the power off state of the system based on one or more of: a timer circuit according to an activation duty cycle defined by a desired quiescent current draw of the microprocessor and a desired maximum speed of the rotatable shaft and a difference in back electromotive force voltage from first and second phases, respectively, of the motor to a reference voltage, wherein the activating of the microprocessor to wake up from the low power sleep mode is responsive to both the timer circuit and the difference in back electromotive force voltage;

determining a first relative position value indicating the relative rotational position of the rotatable shaft at a first time during the power off state utilizing the microprocessor;

deactivating the microprocessor after determining the first relative position value;

determining a second relative position value indicating the relative rotational position of the rotatable shaft at a second time during the power off state utilizing the microprocessor;

determining an amount of relative rotation of the rotatable shaft during the power off state based on the first and second relative position values;

determining a current absolute position value indicating a current absolute rotational position of the rotatable shaft by comparing an absolute position value stored during the power on state and the amount of relative rotation of the rotatable shaft utilizing the microprocessor; and storing the current absolute position value in the memory device.

17. The system of claim 15, wherein the microprocessor is configured to be activated in response to the control signal from the comparator based on a rotational speed of the rotatable shaft being above a threshold rotational speed.

18. A system for determining an absolute rotational position of a rotatable shaft of a motor in an electric power steering system having a power on state and a power off state, comprising:

a microprocessor configured to be periodically activated to wake up from a low power sleep mode during the power off state of the system by a timer circuit according to an activation duty cycle defined by a desired quiescent current draw of the microprocessor and a desired maximum speed of the rotatable shaft, the microprocessor further configured to energize a plurality of position sensors when the microprocessor is activated;

the plurality of position sensors configured to generate at least a first signal and a second signal indicative of a relative rotational position of the rotatable shaft at a first time;

the plurality of position sensors further configured to generate at least a third signal and a fourth signal indicative of a relative rotational position of the rotatable shaft at the second time, the second time being different than the first time; and the microprocessor further configured to determine an amount of relative rotation of the rotatable shaft during the power off state based on a difference between the relative rotational position at the first time and the relative rotational position at the second time, and the microprocessor further configured to determine a current absolute rotational position of the rotatable shaft based on an absolute position value stored during the power on state and the amount of relative rotation of the rotatable shaft.

19. The method of claim 16, wherein activating of the microprocessor is responsive to the difference in back electromotive force voltage based on a rotational speed of the rotatable shaft being above a threshold rotational speed.

* * * * *